UNITED STATES PATENT OFFICE.

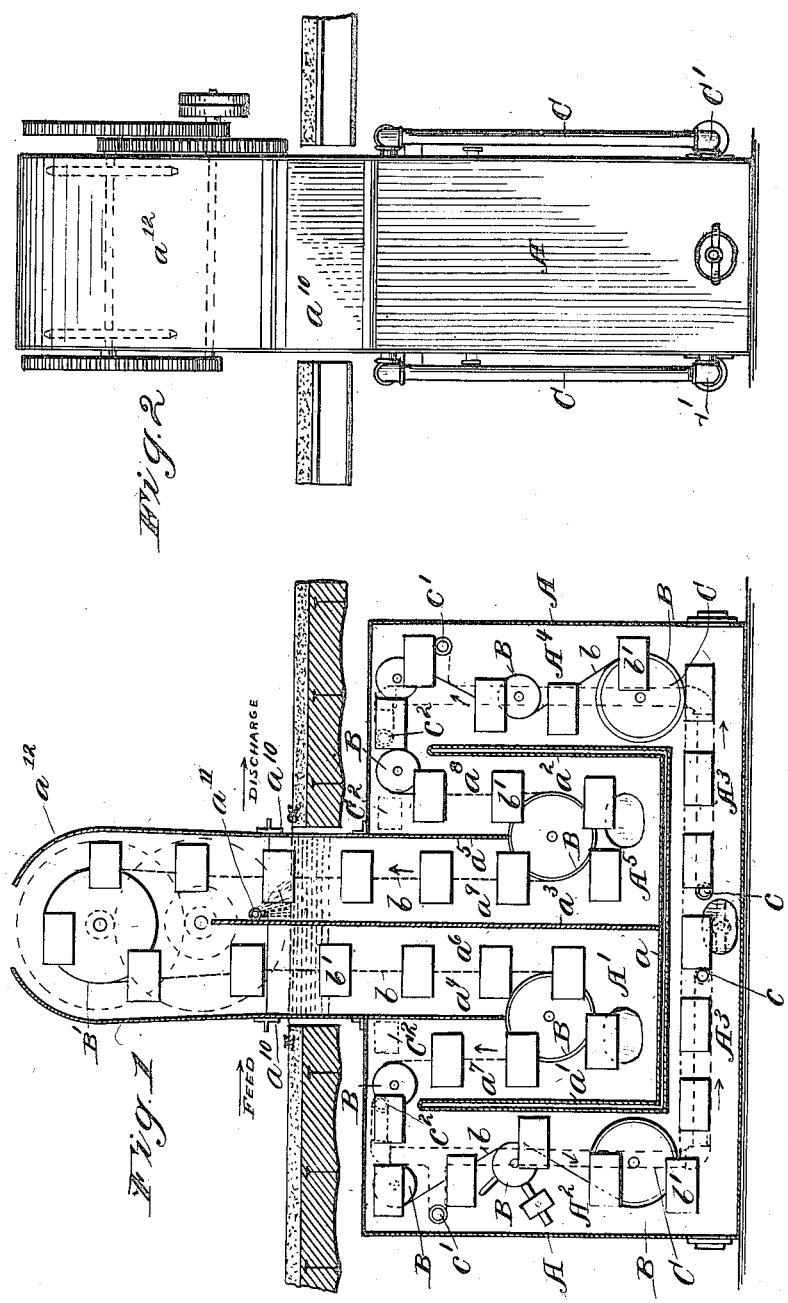

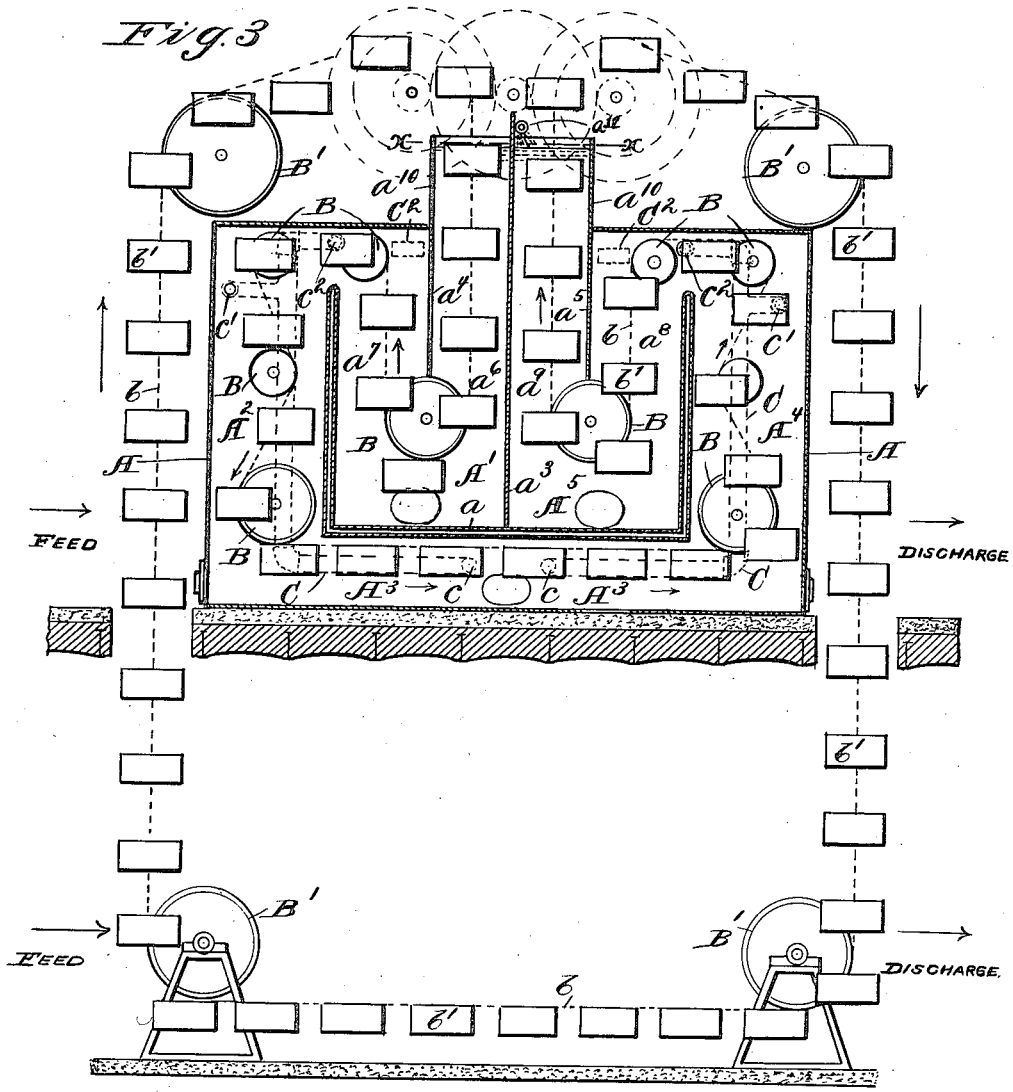

BRYAN D. PINKNEY, OF CLEVELAND, OHIO, ASSIGNOR TO THE LOEW MANUFACTURING COMPANY, OF CLEVELAND, OHIO, A CORPORATION OF OHIO.

PASTEURIZER.

994,192. Specification of Letters Patent. Patented June 6, 1911.

Application filed October 19, 1908. Serial No. 458,543.

*To all whom it may concern:*

Be it known that I, BRYAN D. PINKNEY, a citizen of the United States, and a resident of Cleveland, county of Cuyahoga, and State of Ohio, have invented a new and useful Improvement in Pasteurizers, of which the following is a specification, the principle of the invention being herein explained and the best mode in which I have contemplated applying that principle, so as to distinguish it from other inventions.

The present invention relates to improvements in pasteurizers as indicated; its more particular relation, however, is to pasteurizers of the continuous type, such as are used in beer-bottling establishments and the like.

The object of the invention is the provision of continuous pasteurizing apparatus whereby increased thoroughness and economy of pasteurization is accomplished, while at the same time, by suitable balance and symmetrical disposition of moving parts, operative losses are reduced to a minimum.

To the accomplishment of the above and related ends, said invention, then, consists of the means hereinafter fully described, and particularly pointed out in the claims.

The annexed drawings and the following description set forth in detail certain mechanism embodying the invention, such disclosed means constituting, however, but one of various mechanical forms in which the principle of the invention may be used.

In said annexed drawings: Figure 1 is a diagrammatic sectional view of my improved pasteurizer as adapted for use either in a one storied bottling house with the tank in a pit, or in a two storied bottling house with the tank in the basement; Fig. 2, is a side elevation of such pasteurizer; Fig. 3, is a view similar to Fig. 1, but illustrating the adaptation of the apparatus for use in a two story bottling house with the tank on the second floor; Fig. 4, is a side elevational view of one of the thermostatic control-devices employed in connection with my pasteurizer; and Fig. 5 is an end elevational view of the same.

The main feature of the apparatus in each of its several modified forms of construction, is a tank A suitably supported either in a pit or basement or on a floor of the bottling house, as occasion may demand. Such tank is of rectangular form, and is separated into four alined vertical chambers, $A'$ $A^2$ $A^4$ $A^5$, by transverse partitions, $a'$ $a^2$ $a^3$, rising from a horizontal partition, $a$, whereby the horizontal chamber or passage $A^3$ is provided beneath the two innermost, $A'$ $A^5$, of said alined chambers which horizontal chamber, as will be obvious, serves to connect the lower portion of the two remaining or outermost chambers, $A^2$ $A^4$. Said two innermost chambers are further separated by partitions, $a^4$ $a^5$, depending from above into two compartments, $a^6$ $a^7$, $a^8$ $a^9$, respectively. The outer walls $a^{10}$ and outer separating wall $a^3$ of the two adjacent compartments, $a^6$ $a^9$, are designed to rise above the level $x$—$x$ of the water in the main chamber or tank, which chamber or tank is otherwise closed, so that the two other compartments, $a^7$ $a^8$, together with the outermost chambers $A^2$ $A^4$, are entirely submerged.

At suitable points within the several chambers of the main tank are mounted sheaves or drums, B, by means of which an endless conveyer $b$ is guided through the chambers in such fashion as to suitably carry the trays or other carriers $b'$ in which the bottles or like articles to be pasteurized are placed. Outside of the pasteurizing tank A, such endless conveyer may obviously be conducted as suits the convenience of each individual installation, either terminating just above the open tops of the compartments as shown in Fig. 1, or else being carried over other sheaves $B'$ without the pasteurizer to any desired point or points in the plant, (Fig. 3) for the purpose of loading and unloading the carriers. In the arrangement of conveyer $b$ indicated in Fig. 1, a hood $a^{12}$ serves to house the portion thereof lying outside of the main pasteurizer tank, so that the whole of the apparatus is inclosed. As indicated (Figs. 1 and 2) the direction of movement of the conveyer is downwardly through one inner compartment $a^6$, thence up through the adjacent outer compartment $a^7$, down the corresponding outermost chamber, $A^2$, across the horizontal chamber $A^3$, up the other outermost chamber $A^4$, and finally down and up the two remaining compartments $a^8$ $a^9$, and thence without the pasteurizer.

As is well understood in pasteurizing processes, or methods, the beer when received in the apparatus, is considerably below the pasteurizing temperature, the latter being about 48 degrees R., whereas the bottling operation is carried on just a little above freezing point perhaps three or four degrees R. It accordingly becomes necessary to preliminarily heat or attemperate the beer before subjecting it to the pasteurizing temperature. So too, incidentally to removing the beer from the pasteurizing chamber, its temperature should be gradually lowered, so that upon removal from the apparatus, it will be restored to the normal temperature at which it is maintained for purposes of storage or shipment, all without being subjected at any time to the shock of a sudden change in temperature. The arrangement of chambers and compartments within the tank of my improved pasteurizer, has hence been designed with a view to facilitate the maintenance of the proper temperature of the body of water contained within said tank or chamber, to which end the following additional means are provided. On the exterior of the tank, and laterally of the same there are provided at each end two pipes or conduits, C, the lower ends of which are connected with the horizontal chamber or space $A^3$ at points $c$ near its center, the upper ends of which branch and open into the upper portion of the respective outermost vertical chambers, either $A^2$ or $A^4$. By means of a steam injector $C'$ of familiar construction, and hence not requiring detailed description in this connection, a circulation of water may be maintained from such lower point $c$ of connection of each pipe C to the points $c'$ $c^2$ where its branched upper end is connected with the outer pasteurizing chambers, thence downwardly through each outermost chamber to the lower end of the pipe again. As will be readily understood, such injector serves at the same time to maintain the water, thus put in circulation, at the proper pasteurizing temperature, and that such temperature may be automatically maintained when the apparatus is in operation, thermostats $C^2$, likewise of familiar construction, are employed in conjunction with each of the circulating pipes, C. These thermostats are mounted laterally of the corresponding tank portion near the upper end of the circulating pipe, and are adapted by means of suitable pressure-air connections $c^3$ and a diaphragm valve $c^4$ to appropriately operate the corresponding injector, whenever the temperature at the point of attachment of the thermostat to the tank falls below, or rises above the pre-determined temperature.

While by the means just described, the body of the water throughout the connected series of chambers $A^2$ $A^3$ $A^4$, will be uniformly heated to the pasteurizing temperature and so maintained the water in chamber $A'$ will tend to lose, and that in chamber $A^5$ to gain heat, since the cold bottles are passed through the former and the heated bottles are passed through the latter. For the purpose, hence, of overcoming these effects and more or less equalizing the temperatures in the two chambers just named, I provide a cold spray above the water line in compartment $a^9$ whereby the tendency of the body of water in such compartment to become unduly heated is overcome; the spray, falling as it does directly on the bottles as they emerge, serves to finally cool the latter. In the case of the other compartment $a^6$, I have found that by reason of the particular arrangement of partitions, the water therein will be properly attemperated by conduction from the space $A^2$, through the compartment $a^7$.

From the foregoing description of the construction of my improved pasteurizing apparatus, it will be seen, as has already been remarked, that by reason of the symmetrical disposition of the chambers, and consequently of the corresponding portions of the conveyer passing therethrough, an even pull is at all times secured, so far as mechanical operation of the apparatus is concerned. Moreover, the feed and discharge points of the apparatus are brought closely together, thus permitting the remainder of the more or less cumbersome tank to be disposed out of the way, a feature frequently permitting considerable saving of room. All this is obtained without sacrificing the extent of the passage, or series of connected chambers, wherein the actual pasteurization is effected. At the same time in maintaining the necessary temperature in this portion of the tank, I obtain a unique, and much more effective control by the arrangement and connection of the several circulating and heating devices, than has heretofore been possible, since not only is each end of the chamber (regarding the same as a whole) separately regulated in the matter of temperature, but such independent regulation exists in the case of the two sides of each end. This is a matter of no small importance, for the crates or trays are of a considerable length (such that in fact the tank of the pasteurizer requires to be six or more feet in width), as result of which one side of the pasteurizer may be at the proper temperature, and the other side too cold. This has particularly been apt heretofore to be the case where partially filled trays are put through the pasteurizer, but no such difficulty can arise with the present arrangement.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. A pasteurizer, comprising a tank separated into four vertical chambers, depending partitions separating the two adjacent chambers into two compartments, a horizontal chamber connecting the two outermost chambers but out of direct communication with said adjacent chambers, means for circulating heated water through said chambers, and means for conveying the material to be pasteurized through said chambers.

2. A pasteurizer, comprising a tank separated into four vertical chambers by partitions, depending partitions separating the two adjacent chambers into two compartments, a horizontal chamber lying under, but out of direct communication with, said two adjacent chambers and connecting the lower portions of the two outermost chambers, means for circulating heated water through said chambers, and means for conveying the material to be pasteurized through said chambers.

3. A pasteurizer, comprising a tank separated into four alined vertical chambers by partitions, depending partitions separating the two adjacent chambers into two compartments, the walls of the two adjacent compartments rising above the level of the water in the tank, the remainder of the tank being closed and wholly submerged, a horizontal chamber connecting the lower portions of the two outermost chambers, but out of direct communication with said adjacent chambers, means for circulating heated water through said chambers, and means for conveying the material to be pasteurized to said chambers.

4. A pasteurizer, comprising a tank separated into four alined vertical chambers by partitions, depending partitions separating the two innermost of said chambers into two compartments, a horizontal chamber connecting the lower portions of the outermost chambers but out of direct communication with said innermost chambers, means for circulating heated water downwardly through the outermost chambers, and means for conveying the material to be pasteurized through said chambers.

5. A pasteurizer, comprising a tank separated into four alined vertical chambers by partitions, depending partitions separating the two innermost of said chambers into two compartments, a horizontal chamber connecting the lower portions of the two outermost chambers but out of direct communication with said innermost chambers, means for circulating heated water downwardly through the outermost chambers and thence across the horizontal chamber, and means for conveying material to be pasteurized through said chambers.

6. A pasteurizer, comprising a tank separated into four alined vertical chambers by partitions, depending partitions separating the two innermost chambers into two compartments, a horizontal chamber lying under, but out of direct communication with, the two innermost chambers and connecting the lower portions of the outermost chambers, injector means for withdrawing, and heating, water from substantially the center of the horizontal chamber and transferring the same to the outer upper portions of the outermost chambers.

7. A pasteurizer, comprising a tank separated into four alined vertical chambers by partitions, depending partitions separating the two innermost chambers into two compartments the outer walls of the two adjacent compartments rising above the level of the water in the tank and the remainder of the tank being closed and wholly submerged, a horizontal chamber lying under, but out of direct communication with, said innermost chambers and connecting the lower portions of the outermost chambers, means for attemperating the contents of the two adjacent compartments, and means for withdrawing, and heating, water from substantially the center of the horizontal chamber and transferring the same to the upper portions of the outermost chambers, and means for conveying the material to be pasteurized through said chambers.

8. A pasteurizer, comprising a tank separated into four alined vertical chambers by partitions, depending partitions separating the two innermost chambers into two compartments, the outer walls of the adjacent compartments rising above the level of the water in the tank and the remainder of the tank being closed and wholly submerged, a horizontal chamber lying under, but out of direct communication with, the innermost chambers and connecting the lower portions of the outermost chambers, means for circulating heated water through said chambers, means for conveying the material to be pasteurized through said chambers, means for spraying cooler water into the compartment from which the pasteurized product is discharged, and the construction of the compartment through which the product is admitted being such as to permit water therein to be heated by conduction of the outermost chambers.

Signed by me this 17th day of October, 1908.

BRYAN D. PINKNEY.

Attested by—
ADOLPH HENRY BOEHLER,
DANIEL LOEW.